(12) United States Patent
Inaba

(10) Patent No.: US 10,100,960 B2
(45) Date of Patent: Oct. 16, 2018

(54) HIGH-PRESSURE-STANDABLE PIPE CONNECTOR AND HIGH-PRESSURE-STANDABLE CONNECTOR

(71) Applicant: Kunio Inaba, Kanagawa (JP)

(72) Inventor: Kunio Inaba, Kanagawa (JP)

(*) Notice: Subject to any disclaimer, the term of this patent is extended or adjusted under 35 U.S.C. 154(b) by 260 days.

(21) Appl. No.: 15/024,609

(22) PCT Filed: Mar. 14, 2014

(86) PCT No.: PCT/JP2014/056899
§ 371 (c)(1),
(2) Date: Mar. 24, 2016

(87) PCT Pub. No.: WO2015/093066
PCT Pub. Date: Jun. 25, 2015

(65) Prior Publication Data
US 2016/0281893 A1  Sep. 29, 2016

(30) Foreign Application Priority Data
Dec. 18, 2013 (JP) ................. 2013-261292

(51) Int. Cl.
*F16L 33/22* (2006.01)

(52) U.S. Cl.
CPC ................. *F16L 33/224* (2013.01)

(58) Field of Classification Search
CPC ......... F16L 33/24; F16L 33/22; F16L 33/223; F16L 33/228
USPC ........................ 285/247, 249, 259
See application file for complete search history.

(56) References Cited

U.S. PATENT DOCUMENTS

| 923,081 | A | * | 5/1909 | Sautter | .................. | B29C 35/04 |
| | | | | | | 285/241 |
| 2,206,672 | A | * | 7/1940 | Pederquist | ............ | H01R 4/308 |
| | | | | | | 285/247 |
| 2,688,498 | A | * | 9/1954 | Wilson | .................... | F16L 33/22 |
| | | | | | | 220/324 |

(Continued)

OTHER PUBLICATIONS

International Search Report issued in PCT/JP2014/056899, dated Jun. 10, 2014, pp. 1-3.

*Primary Examiner* — Aaron M Dunwoody
(74) *Attorney, Agent, or Firm* — Jeffrey S. Melcher; Manelli Selter PLLC

(57) ABSTRACT

Provided is a pipe connector having high resistance to pullout force and having high durability. The outer diameter of a nipple (20) is substantially uniform when viewed in the lengthwise direction. The end part of a hose (24) is placed over the nipple (20). A spring (32) is wound around the outer circumference of the hose (24) such that no gap occurs between adjacent wires. The shaft part of a connector main body (14) supports the nipple (20). A fastening nut (26) has an internally threaded part (28) which meshes with an externally threaded part (16) provided on the connector main body (14), and encloses the end part of the hose (24) together with the connector main body (14). The spring (32) is compressed by tightening the threaded part of the fastening nut (26). The end part of the tightly wound spring (32) rotates and the outer diameter thereof is reduced, thereby generating high fastening force. Thereafter the fastened state is maintained by frictional force.

12 Claims, 8 Drawing Sheets

(56) References Cited

U.S. PATENT DOCUMENTS

| | | | | | |
|---|---|---|---|---|---|
| 2,698,191 | A | * | 12/1954 | Samiran | F16L 33/224 285/248 |
| 2,768,845 | A | * | 10/1956 | Samiran | F16L 19/06 285/247 |
| 3,653,691 | A | * | 4/1972 | Bram | F16L 19/061 285/236 |
| 4,059,290 | A | * | 11/1977 | Ichimi | F16L 19/00 285/148.28 |
| 4,400,022 | A | * | 8/1983 | Wright | F16L 33/24 285/256 |
| 4,606,564 | A | * | 8/1986 | Kurachi | F16L 19/065 285/244 |
| 5,286,068 | A | * | 2/1994 | Wiebe | F16L 33/24 285/114 |
| 5,868,440 | A | * | 2/1999 | Kurz | F16L 33/224 285/249 |
| 2003/0088965 | A1 | * | 5/2003 | Green | F16L 35/00 29/520 |

* cited by examiner

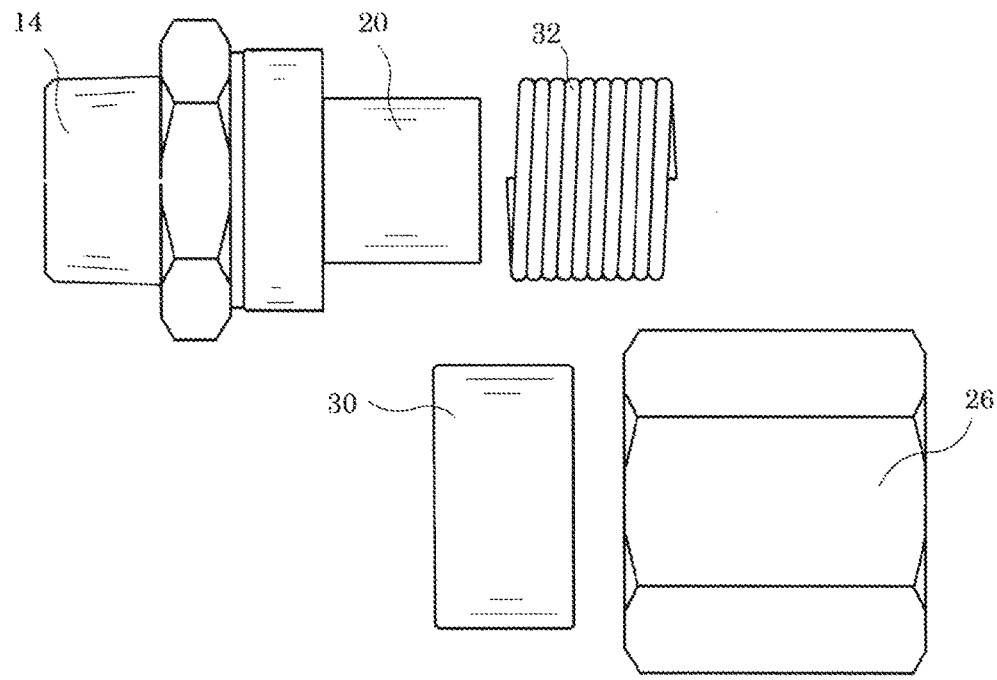
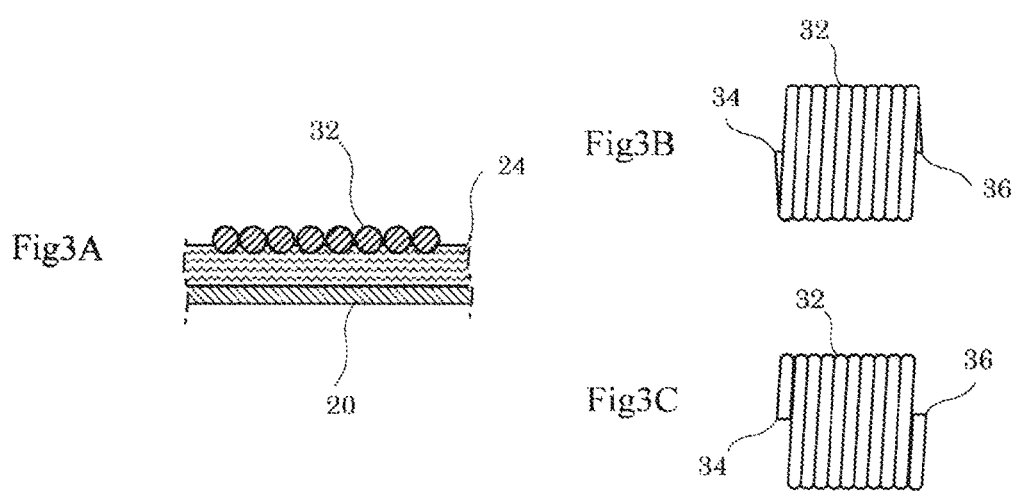

HIGH-PRESSURE-STANDABLE PIPE CONNECTOR AND HIGH-PRESSURE-STANDABLE CONNECTOR

FIELD OF THE INVENTION

The present invention relates to a high-pressure-standable pipe connector in which a contact level between a pressure-standable hose and a nipple inserted in an end portion of the pressure-standable hose is enhanced to stand high internal pressure. Further, the present invention relates to a high-pressure-standable connector capable of standing a high pull-out force.

BACKGROUND OF THE INVENTION

A high-pressure-standable pipe connector, in which a nipple is connected to an end of an enforced pressure-standable hose and the end of the hose is tightly connected to the nipple by a plurality of bands, is well-known (Patent Document 1). Further, a pressure-standable pipe connector, in which a spring wound around an end of a pressure-standable hose is fastened by a nut (sleeve), is also well-known (Patent Document 2). Furthermore, a pressure-standable pipe connector, in which screw threads are cut inside a fastening nut, is also well-known (Paten Document 3).

PRIOR ART DOCUMENT

Patent Document

[Patent Document 1] Japanese Patent Application Publication No. HEI09-236191
[Patent Document 2] Japanese Patent Application Publication No. HEI09-329283
[Patent Document 3] Japanese Patent Application Publication No. 2003-262292

SUMMARY OF THE INVENTION

Problem to Be Solved by the Invention

The conventional arts as shown in the above patent documents have some problems.

When a hose, in which the pressure-resistant characteristic and the heat-resistant characteristic are enhanced due to an improvement of quality of material and structure, is connected to a pipe connector, the high contact level between the hose and the nipple is required to stand internal pressure of the hose.

However, when a hose made of rubber or plastic is connected to the nipple with a band, the tightening force of the band will be decreased due to the creep phenomenon, along with a lapse of time. When a band made of elastic material such as spring is employed, the tightening force of the band maintains to some extent. However, the band itself will yield to the internal pressure of the hose and get loose. Further, if the heat flexibility of hose is large, it is difficult to expect for the hose to have the head-resistant property.

Although there is a way to fasten several parts of the hose end using some bands, the fastening stress will concentrate to those fastened parts. Therefore, those fastened parts may become week in the strength.

Other than these, in order to prevent the hose from being pulled out from the nipple, there is a way to form the surface of the nipple unevenly. However, this necessitates great force for detachment/attachment of the hose and makes complicated the assembly work.

To solve the above problem, the present invention is object to provide a high-pressure-standable pipe connector capable of easily being assembled and having a high resistance to a pull-out force in which the hose is evenly pressed against the nipple having an even surface in order to strongly contact the hose to the nipple.

The present invention is also object to provide a high-pressure-standable connector having the same property as described.

Means of Solving of the Problems

Each configuration following below is to solve the above described problem.

Configuration 1

A high-pressure-standable pipe connector including:
a nipple to be inserted in an end portion of a hose;
a spring wound around an outer circumference of the end portion of the hose so as not to leave a gap between adjacent wires;
a main body supporting the nipple on a shaft;
a fastening nut surrounding the end portion of the hose together with the main body, and formed with a threaded part to be meshed with a threaded part formed on the main body;
a pressing sleeve configured to compress the spring toward the main body with a fastening operation of the threaded part formed on the fastening nut,
wherein at least one of the main body and the pressing sleeve is formed with an opening to contact and receive an end of the spring, and a taper hole getting narrower, and
wherein a winding direction of the spring is set to be coincident with a rotational direction of the threaded part of the fastening nut.

Configuration 2

The high-pressure-standable pipe connector according to configuration 1, wherein an outer diameter of an inserted part of the nipple to be inserted in the hose is uniform when viewed in a longitudinal direction.

Configuration 3

The high-pressure-standable pipe connector according to configuration 1, wherein the inserted part has a larger outer diameter part and a smaller outer diameter part, a difference of a maximum outer diameter and a minimum outer diameter being equal to or less than a size of an outer diameter of the wire of the spring.

Configuration 4

The high-pressure-standable pipe connector according to any one of configurations 1 to 3, wherein both ends of the spring contact with the main body and the pressing nut respectively, without being fixed to anywhere.

Configuration 5

The high-pressure-standable pipe connector according to any one of configurations 1 to 3, wherein the taper hole has a depth to house a winding width of the spring which is increased when the spring reduces its inner diameter.

Configuration 6

The high-pressure-standable pipe connector according to configuration 1, wherein the pressing sleeve and the fastening nut are integrated.

Configuration 7

The high-pressure-standable pipe connector according to configuration 5, wherein the main body and the nipple are integrated.

Configuration 8

A high-pressure-standable connector including:
a spring wound around an outer circumference of a cylindrical or columnar body, which is uniform when viewed in a longitudinal direction, so as not to leave a gap between adjacent wires;
a main body to be fixed to the cylindrical or columnar body;
a fastening nut connected to the main body through threaded parts which meshes with each other to compresses the spring toward the main body with a tightening force generated by a fastening operation of the threaded parts,
wherein at least one of the main body and the pressing sleeve is formed with an opening to contact and receive an end of the spring, and a taper hole getting narrower, and
wherein a winding direction of the spring is set to be coincident with a rotational direction of the threaded parts.

Configuration 9

The high-pressure-standable connector according to any one of configuration 8, wherein both ends of the spring contact with the main body and the pressing nut respectively, without being fixed to anywhere.

Configuration 10

The high-pressure-standable connector according to configuration 8 or 9, wherein the taper hole has a depth to house a winding width of the spring which is increased when the spring reduces its inner diameter.

Effect of the Present Invention

Effect of Configuration 1

When the spring is compressed between the main body and the pressing sleeve, the end portion of the spring, which is housed in the taper hole, is rotated. As the result, the spring is deformed to reduce its inner diameter. Consequently, the restoring force of the spring is suppressed by a frictional force and the winding state of the spring is maintained.

Effect of Configuration 2

As the spring wounded without any gap between adjacent wires has a strong winding force, it makes unnecessary to form the nipple surface unevenly. When the nipple has a uniform outer diameter, it is easy to insert the nipple into the end portion of the hose.

Effect of Configuration 3

The difference between the maximum outer diameter and the minimum outer diameter of the nipple is less than the size of the outer diameter of the wire of the spring. In other words, the difference is negligibly small and the outer diameter of the nipple can be considered as substantially uniform. Because of this, when a pressure in the longitudinal direction is added to the wire, the spring, which is wound around the circumference of the above nipple, will not lose its wound shape. Further, as the outer diameter of the nipple is almost uniform, it is easy to insert the nipple into the hose end.

Effect of Configuration 4

The both ends of the spring are set so as to rotate freely. Therefore, when the inner diameter of the spring is reduced, the spring will maintain the optimum state of length and a useless deformation of the spring is prevented.

Effect of Configuration 5

When the spring reduces its inner diameter, the winding width is increased. Accordingly, the taper hole is provided to house the winding width of the spring.

Effect of Configuration 6

The pressing sleeve and the fastening nut are integrated. Thereby, when the fastening nut rotates, the rotational force is transmitted directly to the spring in the pressing sleeve. This configuration contributes to reduce the number of components.

Effect of Configuration 7

As the main body and the nipple are integrated, this contributes to reduce the number of components.

Effect of Configuration 8

The connector is widely utilized, as it is able to fix firmly a fixing member to a cylindrical or columnar body.

BRIEF DESCRIPTION OF DRAWINGS

FIG. 2 is a side view of each component.

FIG. 3A is a longitudinal sectional view of main parts of the connector; FIGS. 3B and 3C illustrates the spring on each side.

Figure 8A:
Figure 8B:
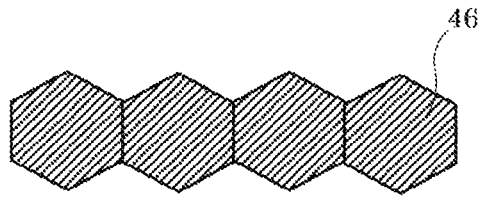
Figure 8C:
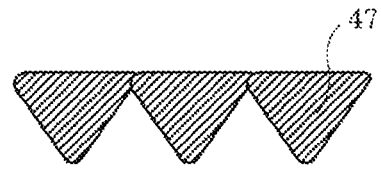

Each one of FIGS. 8A to 8C is a cross sectional view partially illustrating an example which employs a different type of spring.

Figure 9:
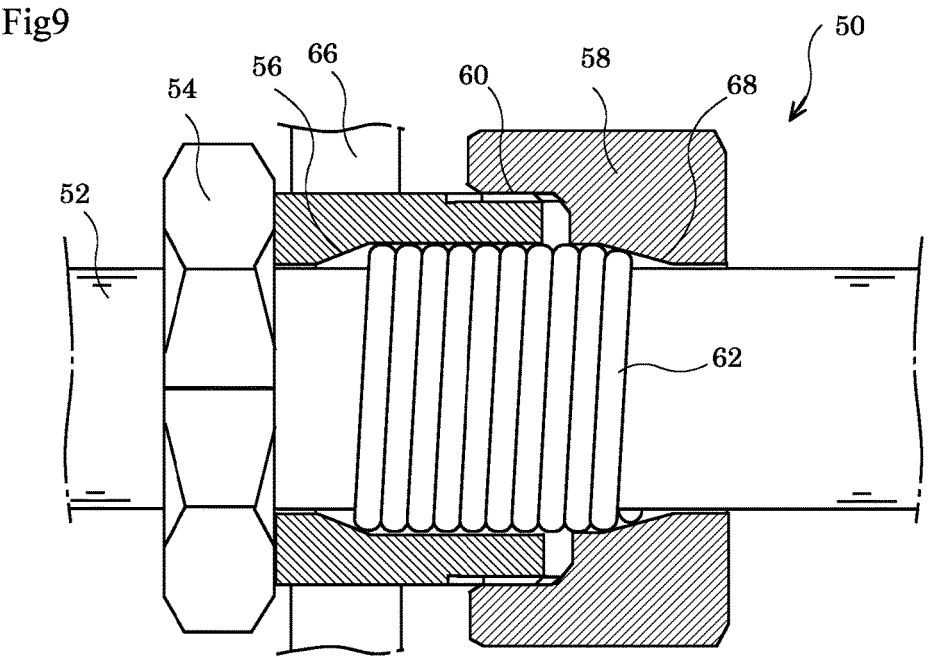

FIG. 9 is a longitudinal sectional view of the high-pressure-standable pipe connector according to a fifth embodiment.

Figure 10:
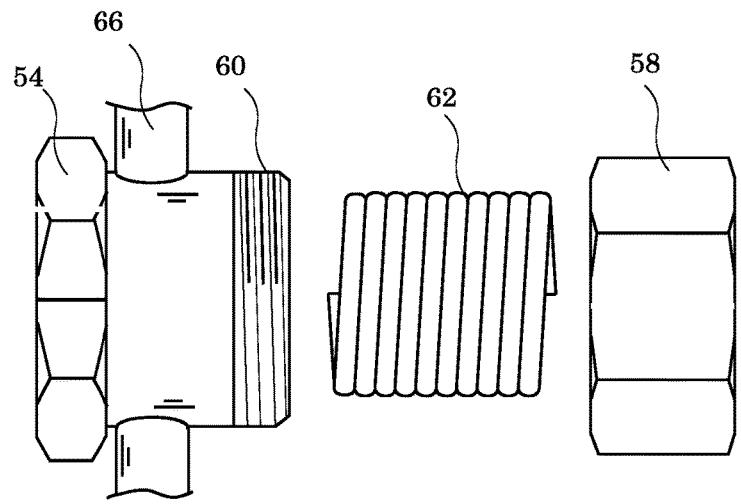

FIG. 10 is a side view of a connector for standing high pressure.

Figure 11:
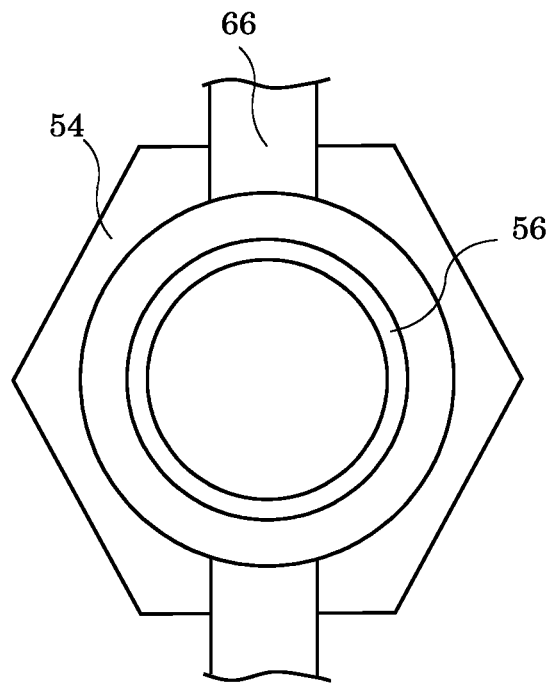

FIG. 11 is a side view of a main body 54.

Figure 12:
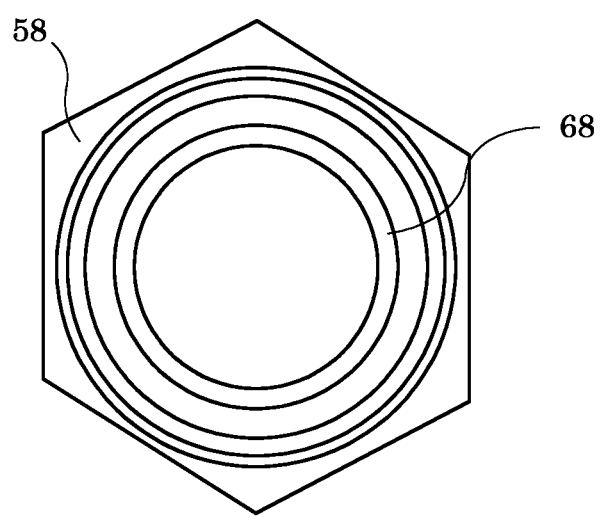

FIG. 12 is a side view of a fastening nut 58.

DESCRIPTION OF THE PREFERRED EMBODIMENT

As follows, embodiments of the present invention are explained in detail.

Embodiment 1

Figure 1A:
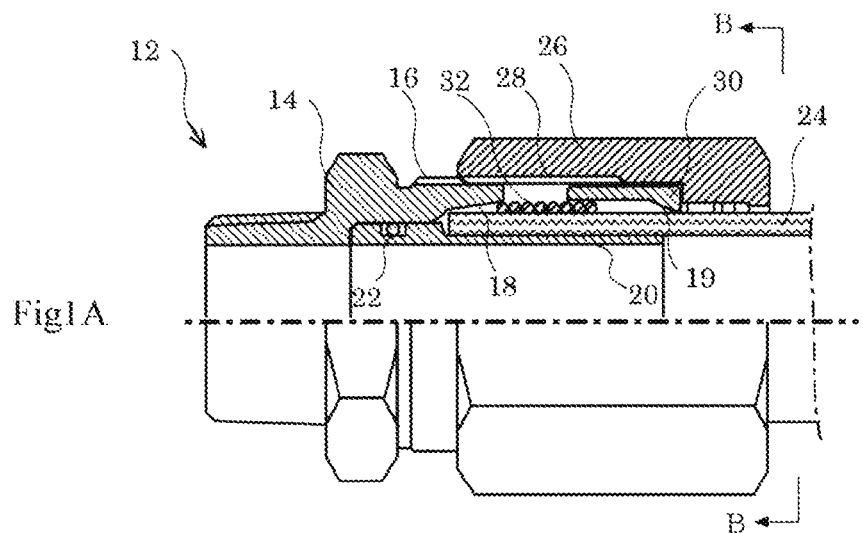
FIG. 1A is a longitudinal sectional view of a high-pressure-standable pipe connector before assembly.
Figure 1B:
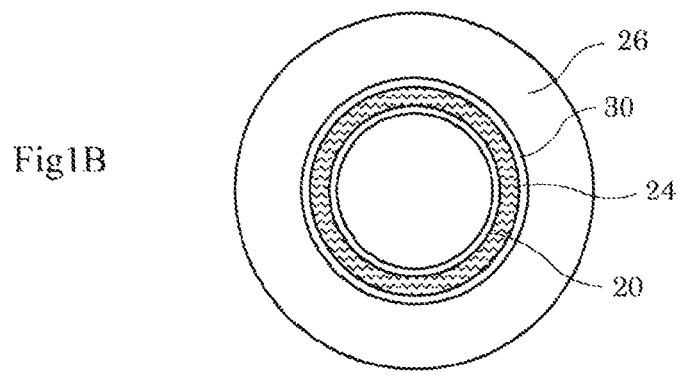
FIG. 1B is a cross sectional view taken along line B-B in FIG. 1A.
Figure 1C:
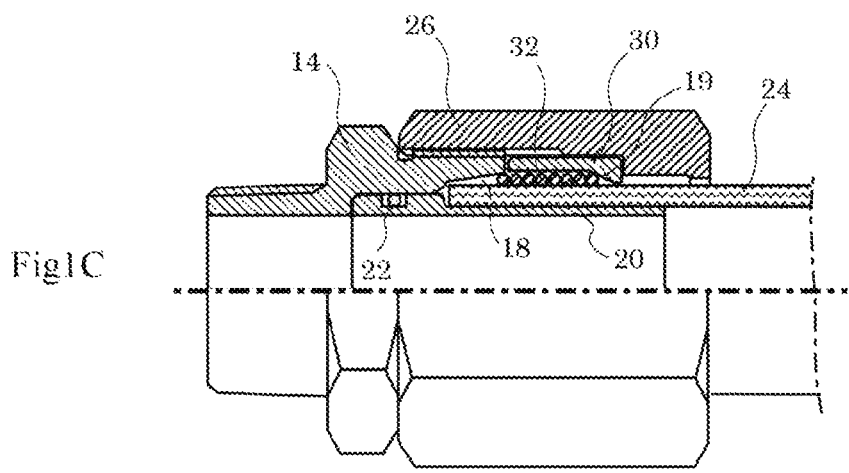
FIG. 1C is a longitudinal sectional view of the pipe connector after assembly.

FIG. 1A is a longitudinal sectional view of a high-pressure-standable pipe connector 12 of the present invention before assembly; FIG. 1B is a cross sectional view taken along line B-B shown in FIG. 1A; and FIG. 1C shows a longitudinal sectional view of the pipe connector 12 after assembly.

A main body 14 is a component to connect a hose 24 to a tube-like thing (not shown). The main body 14 supports a nipple 20 on the shaft. As shown in FIG. 1B, the pipe connector 12 has a cylindrical shape as a whole. The main body 14 and the nipple 20 may be wholly integrated, or otherwise they may well be closely connected with each other via an O-ring 22, as illustrated. The outer surface of the nipple 20 is covered with the end portion of the hose 24.

It is preferable that the outer diameter of the nipple 20 is close to the inner diameter of the hose 24 as possible. Further, the outer diameter of the inserted part of the nipple 20, which is inserted in the hose 24, is preferably formed uniformly in a longitudinal direction. Then, it makes easy to put the end portion of the hose 24 on the outer circumference of the nipple 20. However, the outer surface of the nipple 20 may be formed unevenly, as long as it will not break the alignment of wire constituting a spring 32.

The spring 32 is wound around the outer circumference of the end portion of the hose 24 so as not to leave any gap between adjacent wires. A pressing sleeve 30 is disposed at a fastening nut 26 side. A taper hole 18 is formed in the main body 14 so as to contact one end portion of the spring 32. The taper hole 18 has an opening to receive the one end portion of the spring 32 and is formed to get narrower.

A taper hole 19 is formed in the pressing sleeve 30 so as to contact the other end portion of spring 32. The taper 19 has an opening to receive the other end portion of the spring 32 and formed to get narrower.

The fastening nut 26 has an internally-threaded part 28 which is meshed with an externally-threaded part 16 formed on the main body 14. The main body 14 surrounds the end portion of hose 24 together with the fastening nut 26. When a fastening force is applied to the fastening nut 26, the pressing sleeve 30 is pushed toward the main body 14. With this fasting operation, the one end of the spring 32 is pressed against the taper hole 18 formed in the main body 14, and also the other end of the spring 32 is pressed against the taper hole 19 formed in the pressing sleeve 30.

In the pipe connector 12, the winding direction of the spring 32 is set to be the same as the rotational direction of the fastening nut 26. At the start of the fastening operation of the fastening nut 26, the pressing sleeve 30 pushes the spring 32 toward the main body 14 without rotating together with the fastening nut 26. Thereafter, when the pressure provided from the fastening nut 26 is increased, the pressing sleeve 30 begins rotating along with the rotation of fastening nut 26 in the same direction. In this embodiment, the pressing sleeve is made 1 turn, or rotated about 360 degree. When the pressing sleeve 30 rotates along with the fastening nut 26, the rotational force is transmitted to the spring 32 and the spring 32 is rotated in the same rotational direction. As the result, the spring 32 is deformed to reduce its inner diameter. FIG. 1C illustrates the state where the fastening operation of the fastening nut 26 is completed.

FIG. 2 is a side view of each component said above, including the main body 14, the nipple 20, the pressing sleeve 30, the fastening nut 26, and the spring 32. The high-pressure-standable standable pipe connector 12 of the present embodiment is, as a whole, structured to help reduce the number of components. Next, the function of the spring 32 will be described referring to FIG. 3.

FIG. 3 illustrates the function and the structure of the spring 32; FIG. 3A is a longitudinal sectional view of the main part of the high-pressure-standable pipe connector 12; and FIGS. 3B and 3C show each side of the spring 32.

The spring 32 is wound around the hose 24 at a pitch equal to the outer diameter of the wire constituting the spring 32. This allows the spring 32 to wind around the hose 24 without any gap between adjacent wires. As shown in FIGS. 3B and 3C, the wires are aligned in the same manner, when viewed from any side.

As illustrated in FIG. 3A, for example, the spring 32 made of steel is wound, at a uniform outer diameter, around the end portion of hose 24 made of polyvinyl chloride, not to leave any gap between adjacent wires. In the first embodiment, for example, the nipple 20 having 38 mm diameter, the hose 24 having 48 mm diameter, and the spring 32 of wire diameter (size) 3 mm are employed. Further, for example, the hose 24, in which reinforcing wires are embedded, is proven to be capable of standing hydraulic pressure up to 1.5 Pa under the temperature condition of 100° C. In this embodiment, the spring 32 presses the hose 24 against the outer surface of nipple 20 with a high pressure as shown in FIG. 3A. When 1.5 Pa hydraulic pressure was added inward the hose 24 under the temperature of 100° C., the pipe connector 12 according to the present embodiment demonstrates a strong connection with the hose 24 such that the hose 24 could never be pulled out.

When the spring 32 is compressed between the main body 14 (FIG. 1) and the pressing sleeve 30 (FIG. 1) by the fastening operation of the fastening nut 26, the spring 32 is deformed to reduce its inner diameter. As the result, the uneven surface, which is formed by the wires on which a gap is not formed between adjacent wires, presses the hose 24 toward the outer surface of the nipple 20, as illustrated in FIG. 3A. When the spring 32 is pressed from both sides, wherein the wire is wound not leaving any gap between adjacent wires, the restoring force of the spring is suppressed by a frictional force. Therefore, the hose 24 is held tightly between the spring 32 and the nipple 20 and the fastened state is maintained.

Figure 4A:
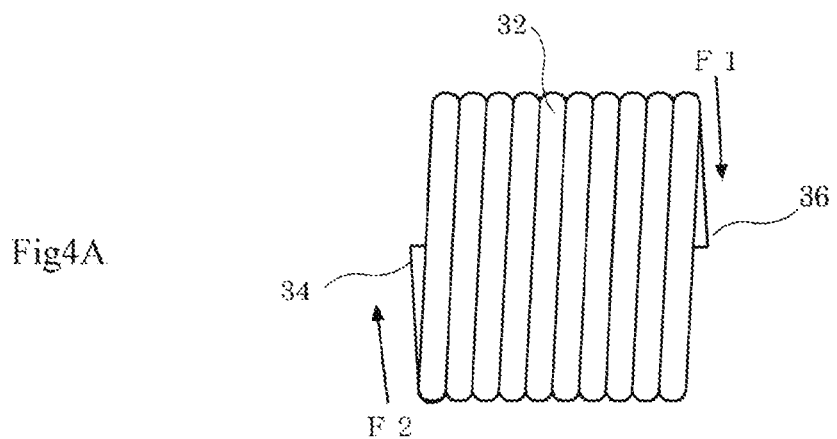
FIG. 4A shows a side view of a spring.
Figure 4B:
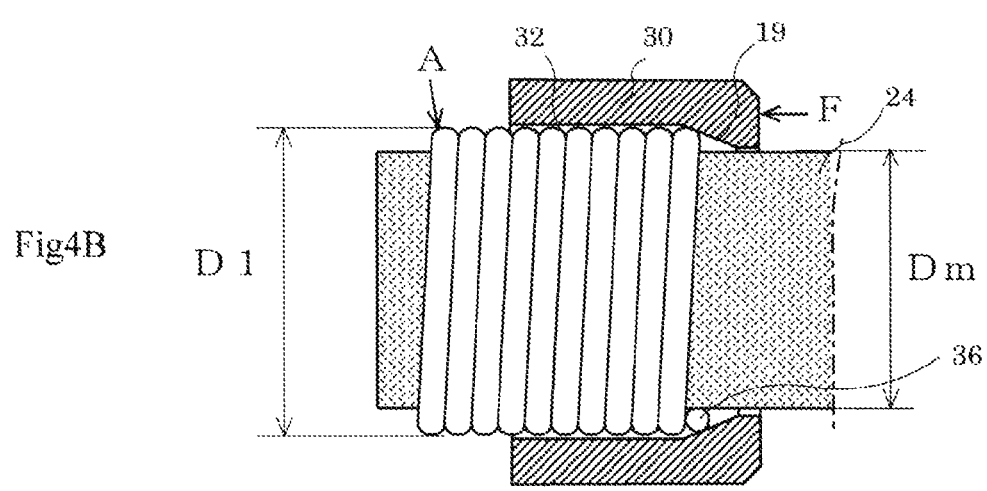
FIG. 4B illustrates the state of the spring before reducing its inner diameter.
Figure 4C:
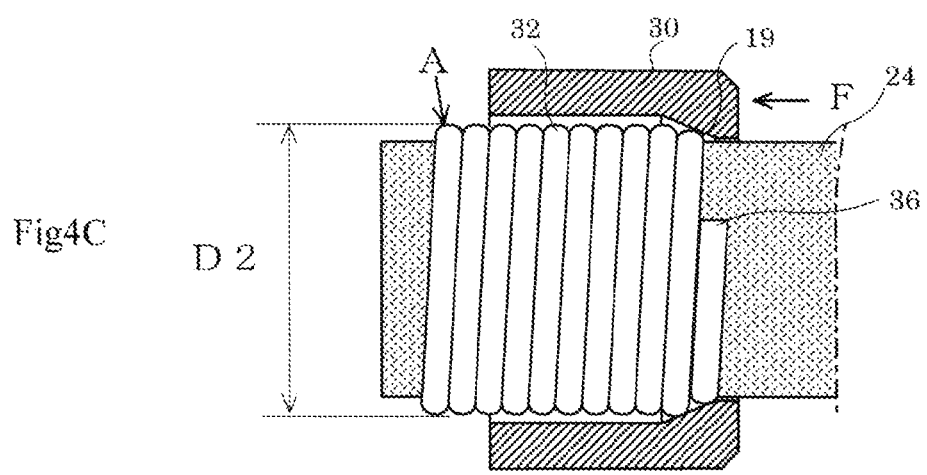
FIG. 4C illustrates the state after the reduction.

FIG. 4A is a side view of the spring 32; FIG. 4B illustrates the state of the spring 32 before reducing its inner diameter, and FIG. 4C illustrates the state after reducing its inner diameter.

As illustrated in FIG. 4A, in the spring 32, the wire is wound helically without leaving any gap between adjacent wires. As illustrated in FIGS. 3A and 3B, wires in the spring 32 are aligned in the same manner, when viewed from any side.

As illustrated in FIG. 4B, the spring 32 is wound around the end portion of the hose 24 so as not to leave any gap between adjacent wires. The outer diameter of the spring 32 is uniform. When the fastening force is applied to the fastening nut 26 (FIG. 1A), as illustrated in FIG. 4B, the pressing sleeve 30 pushes the spring 32 in the direction of arrow F, with the state that end portion 34 (one end of the spring 32, indicated by arrow A in FIG. 4) is pressed firmly against the taper hole 18 (FIG. 1) formed in the main body 14 (FIG. 1).

The other end portion 36 of the spring 32 is deformed to reduce its inner diameter so as to fit into the taper hole 19 of the pressing sleeve 30. When the fastening nut 26 (FIG. 1) continues to push the pressing sleeve 30, the frictional force between the fastening nut 26 and the pressing sleeve 30 is raised. Then, the pressing sleeve 30 begins to rotate together with fastening nut 26. As the pressing sleeve 30 contacts firmly against the end portion 36 of the spring 32, the force F1 (FIG. 4A) to rotate around the hose 24 is delivered to the end portion 36.

When the force is transmitted to the spring 32, the spring deforms to reduce the inner diameter almost evenly. Specifically, the inner diameter of the spring 32 is reduced evenly from the original size of D1 to D2, at last. The end portion 36 of the spring 32, which is positioned the lower of the hose 24 in FIG. 4B, is shifted to the middle part of the side of the hose 24 in FIG. 4C.

When the inner diameter of the spring 32 is reduced, the winding number is increased by 1 or 2 turns. This means that the spring 32 gets longer in a longitudinal direction to that extent. As the result, the compressive force added in a longitudinal direction of the spring 32 is increased further. Therefore, the spring 32 is as a whole fixed and keeps the state as it is by a frictional force. In other words, the spring 32 will never get loose thereafter.

FIG. 5 explains an operation of the high-pressure-standable pipe connector 12 of the present invention, in more detail.

Figure 5A:
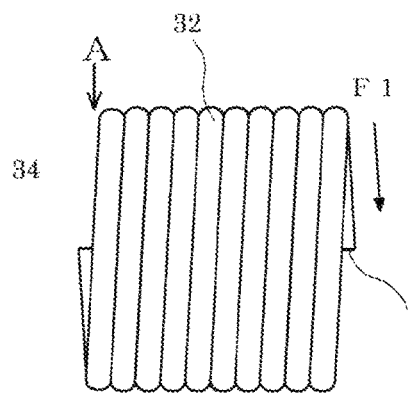
FIGS. 5A, 5B, 5C, 5D, 5E and 5F explains a working process of the connector of the present invention, in more detail.

In FIG. 5A, one end of the spring 32 indicated by arrow A is referred to as one end portion 34 and the other end of the spring 32 is referred to as the end portion 36. The one end portion 34 is pressed to the taper hole 18 formed in the main body 14 (FIG. 1) and reduces its outer diameter slightly.

Figure 5B:
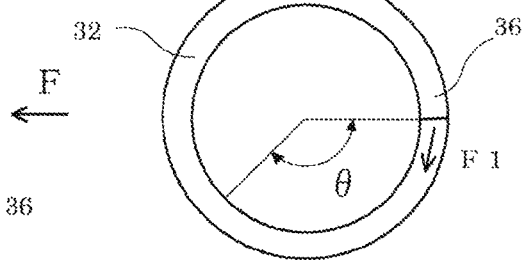
Figure 5C:
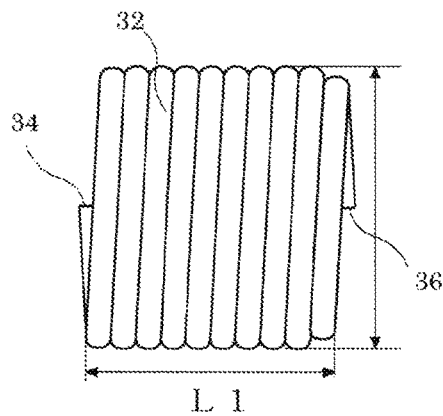
Figure 5D:
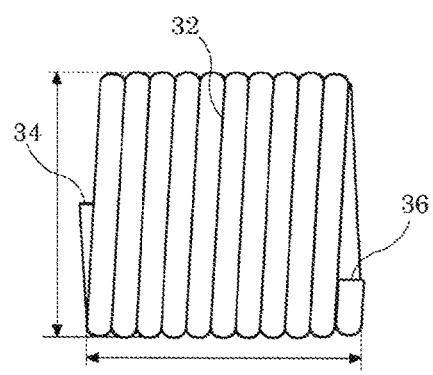

In this state, the other end portion 36 of the spring 32 is rotated by angle θ, as illustrated in FIG. 5B. FIG. 5C shows the state of end portion 36 before rotating and FIG. 5D shows the state after rotating. Due to the rotation of the other end portion 36, the length of the spring 32 increases from L1 up to L2. For example, when the end portion 36 makes 1 turn, the spring 32 gets longer by the size of the outer diameter of the wire, instead of reducing its inner diameter.

Figure 5E:
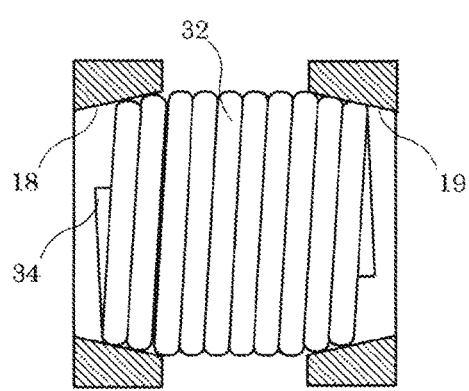

At this stage, the one end portion 34 of the spring 32 deeply enters into the taper hole 18 of the main body 14, meanwhile the other end portion 36 deeply enters into the taper hole 19 of the pressing sleeve 30. Then, as illustrated in FIG. 5E, both ends of the spring 32 deforms to further reduce the inner diameter. Since the hose 24 to which the spring 32 is wound is more flexible than the spring 32, the spring 32 deforms to reduce its inner diameter almost evenly due to the flexibility of the hose 24.

Thus, the taper holes 18 and 19 are design to receive the winding width (L1-L2) which is increased when the spring 32 reduces its inner diameter. Therefore, the taper holes 18 and 19 preferably have enough depth to house the winding width. Specifically, it is preferable that the length of the direction along the axis of both of the taper holes 18 and 19 have equal or twice length of the wire diameter of the spring 32.

Figure 5F:
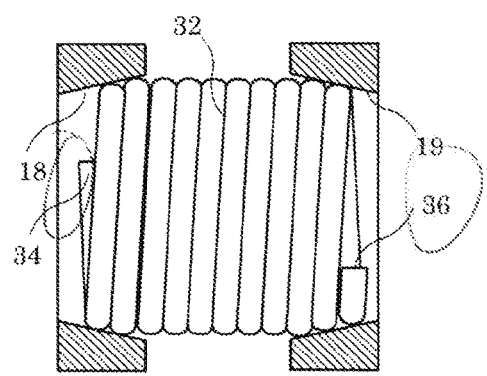

Whereas each end of the spring 32 comes into contact with the main body 14 or the pressing sleeve 30 respectively, the both ends portion are not fixed to anywhere. Assuming that the other end portion 36 of the spring 32 is pressed to the taper hole 19 formed in the pressing sleeve 30 and is rotated by the rotational force generated by the rotation of the pressing sleeve 30. The spring 32 will reduce its inner diameter by the shifting length of the end portion 36. However, once the spring 32 reaches the point where it cannot reduce its inner diameter any more, the spring itself rotates since the end portion 34 of the spring 32 is not fixed to the main body 14. Thus, the spring 32 is refrained from the exposure to an excessive pressure. Then, the inner diameter of the spring 32 becomes almost uniform thoroughly at this time, as illustrated in FIG. 5F.

In FIG. 1, the spring 32 is compressed between the main body 14 and the pressing sleeve 30. This helps to generate a winding force in the spring 32. Consequently, the restoring force of the spring 32 is suppressed by a high frictional force and the winding state of the spring 32 is maintained. In the state shown in FIG. 1B, the spring 32 will never restore in shape so that it does not change its outer diameter even if the frictional force act, as long as the fastening nut 26 is not reversed and unwound.

Embodiment 2

FIG. 6 shows a comparison of the effect of the spring 32 with an example employing a different type of spring.

Figure 6A:
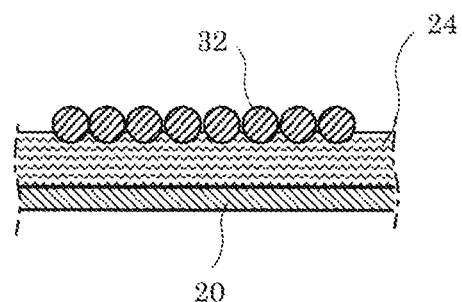
FIGS. 6A, 6B, and 6C show the effect of the spring of the present invention, using some examples.
Figure 6B:
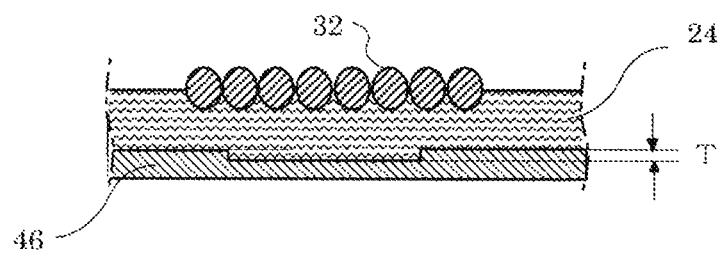
Figure 6C:
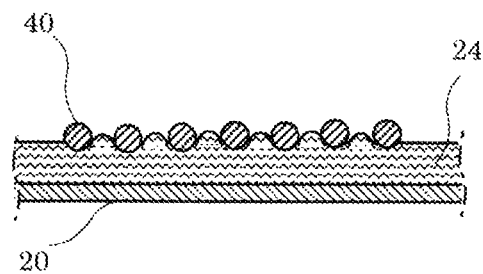

FIG. 6A is a longitudinal sectional view of the main part of the pipe connector of the first embodiment; FIG. 6B is a longitudinal sectional view of the main part of the pipe connector of the second embodiment; and FIG. 6C is a longitudinal sectional view of the main part of the pipe connector of the comparative example.

In the present invention, as illustrated in FIG. 1, since the spring 32 is compressed between the main body 14 and the pressing sleeve 30, the spring 32 has to be structured to stand the compressive pressure and to prevent a collapse of the winding state of the spring 32. For this reason, it is preferable that the outer diameter of the spring 32 is almost uniform in a longitudinal direction, as shown in FIG. 6A. Then, it is preferable that the outer surface of the nipple 20 is not uneven but substantially even, although the type of nipple 20 with uneven surface is widely employed conventionally. Since the type of nipple 20 with the even surface is easy to put in the hose 24, it helps to improve the work efficiency.

At first, the inner diameter of spring 32 is changeable relatively freely. Accordingly, the same spring 32 can be used appropriately to wind around the end of the hose 24, even if the outer diameter of the hose 24 is slightly larger/smaller. Further, as illustrated in FIG. 6B, even if there are some differences in level on the outer surface of a nipple 46, the spring 32 can be wound around the outer circumference of the hose 24 so as not to leave any gap between adjacent wires.

In the second embodiment, the size of the outer diameter of the inserted part of the nipple 46, which is the part to be inserted in the hose 24, is not uniform and getting larger and smaller partially. This is no problem as long as the difference between the maximum outer diameter and the minimum outer diameter stays less than the size of the outer diameter of the wire of the spring 32. It is preferable that the difference T on the outer surface of the nipple 46, shown in FIG. 6B, is set within one-half of the size of the outer diameter of the wire. By forming the difference in the outer surface of the nipple 46, the hose 24 and the nipple 46 is fit firmly with each other. Compared with the nipple 20 in the first embodiment, it is still easy to insert the nipple 46 into the hose 24, all the same.

The comparative example in FIG. 6C shows that the wire of a spring 40 is wound around the outer surface of the hose 24, with some gaps between adjacent wires. In this case, even when the outer surface of the spring 40 is reduced and the winding force of the spring to hold the hose 24 is increased, the winding force will escape from the gaps between wires, due to the coating of the hose 24 swelling outward. Therefore, the spring cannot press the hose 24 to the nipple 20 with a sufficiently high pressure.

As illustrated in FIGS. 6A and 6B, the end portion of the hose 24 is firmly pressed and fixed to the outer surface of the nipple 20 by the uneven surface of the spring 32. Since the spring 32 is wound not leaving any gap between adjacent wires, the hose 24 cannot swell or escape from between wires. Therefore, the end portion of the hose 24 is firmly pressed against the nipple 20. As the effect of this, when the temperature of the hose 24 rises to the point where the material of the hose begins to get softer, the pressed state of end portion of the hose 24 to the nipple 20 is maintained.

Embodiment 3

Figure 7:
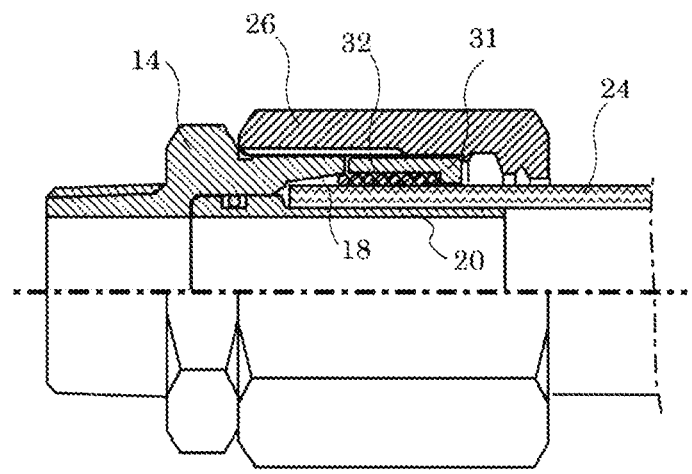
FIG. 7 is a longitudinal sectional view of a high-pressure-standable pipe connector according to a third embodiment.

FIG. 7 is a longitudinal sectional view of a high-pressure-standable pipe connector of the third embodiment. This is the same as the high-pressure-standable pipe connector of the first embodiment except for the structure of a pressing sleeve 31. The pressing sleeve 31 is not formed with the taper hole 19 (FIG. 1). While the taper hole 18 formed in the main body 14 receives one end of the spring 32, the other end of the spring 32 comes into contact with the pressing sleeve 31 with its plane surface. By applying a rotational force to the fastening nut 26, the pressing sleeve 31 is fastened and then presses the pressing sleeve 30 toward the main body 14.

In this high-pressure-standable pipe connector, the winding direction of the spring 32 is set to be coincident with the rotational direction of the threaded part of the fastening nut 26. At the start of the fastening operation on the fastening nut 26, the pressing sleeve 30 pushes the spring 32 toward the main body 14 without rotating together with the fastening nut 26 until the pressure on the contact surface with the fastening nut 26 gets higher enough. Thereafter, the pressure on the contact surface continues to increase, then the heightened pressure begins to rotate the pressing sleeve 30 along with the rotation of the fastening nut 26 in the same direction.

When the pressing sleeve 30 begins to rotate along with the fastening nut 26 in the same direction, the rotational force in the same direction is provided to the other end portion of the spring 32 due to the friction force. As the result, the spring 32 is deformed to reduce its inner diameter. Therein, the taper hole 18 in the main body 14 acts to reduce the inner diameter of one end portion of the spring 32. Then, the pressing sleeve 31 delivers the rotational force to the other end portion of the spring 32. When the rotational force is transmitted to the spring 32, the spring deforms to reduce the inner diameter almost uniformly, as illustrated in FIG. 5F.

Once the spring 32 reaches the point where it cannot deform any more, the spring 32 begins to slip inside the pressing sleeve 30. As the result, an unnecessary rotational force is prevented from being applied to the spring 32. Thereby, the end portion of the hose 24 is firmly pressed and fixed to the outer surface of the nipple 20 by uneven surface of the spring 32, which is wound leaving any gap between adjacent wires.

Embodiment 4

FIG. 8 partially illustrates a cross sectional view of the example employing a different type of the spring 32. The cross-section surface of the wire of the spring 32 may well be elliptical as in FIG. 8A, or polygonal as in FIG. 8B, or further triangle as in FIG. 8C. By employing any of the above types of wire, the inner diameter of the spring 32 can be reduced without collapsing the adjacency between wires, as long as the outer surface of the hose is even. Especially, the wire having the cross-sectional shape of FIG. 8C is able to hold the hose effectively with a strong binding force, as the wire makes deep grooves on the outer surface of the hose in order to reduce its inner diameter.

Embodiment 5

FIG. 9 is a longitudinal sectional view of a high-pressure-standable connector 50 of a fifth embodiment, where said connector structure is utilized to connect some other stuff than a hose. FIG. 10 is a side view of the high-pressure-standable connector. FIG. 11 is a cross-section of a main body 54 taken from the right side in FIG. 10. FIG. 12 is a cross-section of a fastening nut 58 taken from the left side in FIG. 10.

The high-pressure-standable connector 50 of the fifth embodiment is designed to fix a variety of construction to a stuff having a circular cross-section such as a column 52. The column 52 is a pillar or a tube like thing whose outer surface is uniform in a longitudinal direction. In FIG. 9, a connecting body 66, which is shown partially, is fixed integrally in the main body 54. The connecting body 66 is an object to be fixed to the column 52; the end portion of the connecting body 66 is connected to any arbitrary structure (not shown).

In FIG. 9, a spring 62 is wound around the outer circumference of the column 52 so as not to leave any gap between adjacent wires. The fastening nut 58 is connected to the main body 54 through a threaded part 60 which meshes with the threaded part of the main body 54. The spring 62 is compressed toward the main body 54 with a fastening force generated in the threaded part 60 of the fastening nut 58, according to a fastening operation on the fastening nut 58.

A taper hole 56 is formed in the main body 54 and a taper hole 68 is formed in the fastening nut 58. Each of the taper holes 56 and 58 has an opening which contact and receive the each end of the spring 62 and formed to get narrower. Therein, the winding direction of the spring 62 is set to be coincident with the rotational direction of the threaded part 60 of the fastening nut 58.

The force to reduce the inner diameter of the spring 62 is generated, according to the fastening operation on the fastening nut 58. Therein, if a hard tube or a pillar is employed as the column 52, the inner diameter of the spring 62 is reduced only a little. Yet, as the spring 62 having a strong winding force to hold the column 52, the main body 54 and the column 52 can be fixed firmly each other. When an optimal tightening torque is obtained in advance and the fastening nut 58 is fastened with that optimal torque; this ensures not only firm but quick connection of the main body 54 and the column 52. Additionally, as shown in FIG. 10, only three components are necessary in here.

Function of the spring 62 when a fastening force is applied to the fastening nut 58, is the same as described in the above embodiment. Each end of the spring 62 comes into contact with the main body 54 or the fastening nut 58 respectively, and the both end portions are preferably not fixed to anywhere. The taper holes 56 and 58 preferably have a depth to house the winding width of the spring 62 which is increased when the spring reduces its outer diameter.

In this embodiment, since the inner diameter of the spring 62 is reduced only a little, the depth of the taper holes 56 and 58 may well be shallower than that of the above embodiment. Further, a taper hole may be provided in either the main body 54 or the fastening nut 58. The connector 50 of the fifth embodiment, as explained up to here, can be widely utilized for a fixing of various kinds of stuff, functioning in the same principle as the pipe connector 12 in the earlier embodiment.

DESCRIPTION OF THE REFERENCE NUMERALS

12 high-pressure-standable pipe connector
14 main body
16 externally threaded part
18 taper hole
19 taper hole
20 nipple
22 O-ring
24 hose
26 fastening nut
28 internally threaded part
30 pressing sleeve
31 pressing sleeve
32 spring
34 one end portion
36 the other end portion
40 spring
46 nipple
50 high-pressure-standable connector
52 column
54 main body
56 taper hole
58 fastening nut
60 threaded part
62 spring
66 connecting body
68 taper hole

What is claimed is:

1. A high-pressure-standable pipe connector comprising:
a nipple to be inserted in an end portion of a hose;
a spring wound around an outer circumference of the end portion of the hose so as not to leave a gap between adjacent wires;
a main body supporting the nipple on a shaft;
a fastening nut surrounding the end portion of the hose together with the main body, and formed with a threaded part to be meshed with a threaded part formed on the main body;
a pressing sleeve configured to compress the spring toward the main body with a fastening operation of the threaded part formed on the fastening nut,
wherein at least one of the main body and the pressing sleeve is formed with an opening to contact and receive an end of the spring, and a taper hole getting narrower, and
wherein a winding direction of the spring is set to be coincident with a rotational direction of the threaded part of the fastening nut.

2. The high-pressure-standable pipe connector according to claim 1, wherein an outer diameter of an inserted part of the nipple to be inserted in the hose is uniform when viewed in a longitudinal direction.

3. The high-pressure-standable pipe connector according to claim 1, wherein the inserted part has a larger outer diameter part and a smaller outer diameter part, a difference of a maximum outer diameter and a minimum outer diameter being equal to or less than a size of an outer diameter of the wire of the spring.

4. The high-pressure-standable pipe connector according to claim 2, wherein a first end portion of the spring contacts the main body and a second end portion of the spring contacts the pressing nut.

5. The high-pressure-standable pipe connector according to claim 2, wherein the taper hole has a depth to house a winding width of the spring which is increased when an inner diameter of the spring is reduced.

6. The high-pressure-standable pipe connector according to claim 1, wherein the pressing sleeve and the fastening nut are integrated.

7. The high-pressure-standable pipe connector according to claim 1, wherein the main body and the nipple are integrated.

8. A high-pressure-standable connector comprising:
a spring wound around an outer circumference of a cylindrical or columnar body, which is uniform when viewed in a longitudinal direction, so as not to leave a gap between adjacent wires;
a main body to be fixed to the cylindrical or columnar body;
a fastening nut connected to the main body through threaded parts which meshes with each other to compresses the spring toward the main body with a tightening force generated by a fastening operation of the threaded parts,
wherein at least one of the main body and the pressing sleeve is formed with an opening to contact and receive an end of the spring, and a taper hole getting narrower, and
wherein a winding direction of the spring is set to be coincident with a rotational direction of the threaded parts.

9. The high-pressure-standable connector according to claim 8, wherein a first end portion of the spring contacts the main body and a second end portion of the spring contacts the pressing nut.

10. The high-pressure-standable connector according to claim 8, wherein the taper hole has a depth to house a winding width of the spring which is increased when an inner diameter of the spring is reduced.

11. The high-pressure-standable pipe connector according to claim 3, wherein a first end portion of the spring contacts the main body and a second end portion of the spring contacts the pressing nut.

12. The high-pressure-standable pipe connector according to claim 3, wherein the taper hole has a depth to house a winding width of the spring which is increased when an inner diameter of the spring is reduced.

* * * * *